US010606582B2

(12) United States Patent
Yehuda et al.

(10) Patent No.: US 10,606,582 B2
(45) Date of Patent: Mar. 31, 2020

(54) AUTOMATED MOBILE APPLICATION INTEGRATION

(71) Applicant: Appdome Ltd., Tel Aviv (IL)

(72) Inventors: Avner Yehuda, Ramat Gan (IL); Gil Hartman, Tel Aviv (IL); Tomas Tovar, Redwood City, CA (US)

(73) Assignee: APPDOME LTD., Tel Aviv (IL)

( * ) Notice: Subject to any disclaimer, the term of this patent is extended or adjusted under 35 U.S.C. 154(b) by 0 days.

(21) Appl. No.: 16/163,470

(22) Filed: Oct. 17, 2018

(65) Prior Publication Data

US 2019/0114160 A1 Apr. 18, 2019

Related U.S. Application Data

(60) Provisional application No. 62/573,662, filed on Oct. 17, 2017.

(51) Int. Cl.
*G06F 8/70* (2018.01)
*G06F 9/445* (2018.01)
*G06F 8/54* (2018.01)

(52) U.S. Cl.
CPC ............ *G06F 8/70* (2013.01); *G06F 8/54* (2013.01); *G06F 9/44526* (2013.01)

(58) Field of Classification Search
CPC ..... G06F 8/54; G06F 8/70; G06F 8/76; G06F 9/44526
USPC ................................................. 717/120–123
See application file for complete search history.

(56) References Cited

U.S. PATENT DOCUMENTS

| 6,023,583 | A | 2/2000 | Honda |
| 7,734,689 | B2 | 6/2010 | Richer et al. |
| 8,522,042 | B2 | 8/2013 | Barron et al. |
| 8,984,272 | B2 | 3/2015 | Kohiyama et al. |

(Continued)

OTHER PUBLICATIONS

Chernoff et al. "FX! 32: A profile-directed binary translator." In: IEEE Micro 2. Mar. 1998 (Mar. 1998) Retrieved from <ftp://ftp.cis.upenn.edu/pub/cis700-6/public_html/04f/papers/chernoff-fx32.pdf> entire document.

(Continued)

*Primary Examiner* — Qing Chen
(74) *Attorney, Agent, or Firm* — Fish & Richardson P.C.

(57) ABSTRACT

Systems, methods, devices and non-transitory, computer-readable storage mediums are disclosed for automated mobile app integration. In an embodiment, a method comprises: receiving, by a server computer from a development system, a first application binary executable for an application; receiving, by the server computer, a dataset specifying mobile services to be added to the application, the dataset selected by a user of the development system; dynamically and automatically generating a software adapter for adapting one or more plugin software components to the first app binary executable according to the dataset; generating, by the server computer and without access to source code for the first application binary executable, a second application binary executable for the application, the generating including merging the first application binary executable with binary code for the adaptor and the plugin software components; and transmitting, by the server computer to the development system, the second application binary executable.

23 Claims, 13 Drawing Sheets

(56) References Cited

U.S. PATENT DOCUMENTS

| | | |
|---|---|---|
| 9,164,754 B1 | 10/2015 | Pohlack |
| 9,177,117 B2 | 11/2015 | Kohiyama et al. |
| 2002/0042833 A1 | 4/2002 | Hendler et al. |
| 2012/0110558 A1* | 5/2012 | Anan .................. G06F 8/52 717/140 |
| 2012/0304160 A1 | 11/2012 | Soeder |
| 2014/0289726 A1 | 9/2014 | Rugina et al. |
| 2014/0366015 A1* | 12/2014 | Dobson ................ G06F 8/60 717/177 |
| 2015/0339137 A1 | 11/2015 | Andrus et al. |
| 2016/0092675 A1 | 3/2016 | Vidrine et al. |
| 2016/0103667 A1 | 4/2016 | Chen et al. |
| 2016/0132806 A1* | 5/2016 | To .................. G06Q 10/06313 705/7.23 |
| 2016/0132808 A1* | 5/2016 | To .................. G06Q 10/06315 705/7.25 |
| 2016/0162287 A1* | 6/2016 | Chirstopher ............. G06F 8/44 717/122 |
| 2017/0060565 A1* | 3/2017 | Yehuda ............... G06F 9/44521 |
| 2017/0097740 A1* | 4/2017 | Kimber ................ H04L 67/02 |
| 2017/0139696 A1* | 5/2017 | Yehuda .................. G06F 8/61 |
| 2017/0308418 A1* | 10/2017 | Guo ........................ G06F 8/70 |

OTHER PUBLICATIONS

International Searach Report and Written Opinion of the International Searching Authority, International Application No. PCT/US2018/056359, dated Jan. 3, 2019, 11 pages.

\* cited by examiner

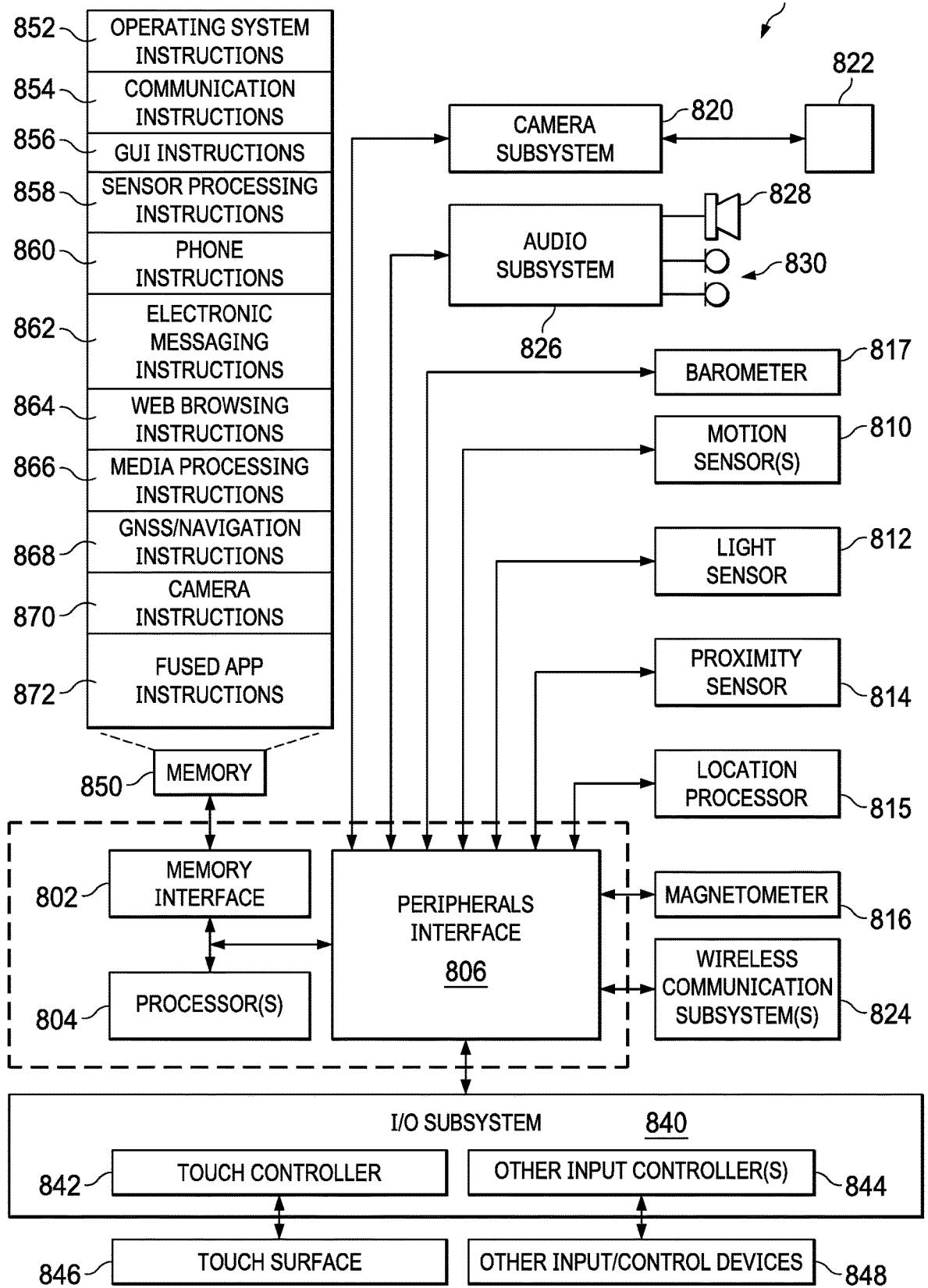

AUTOMATED MOBILE APPLICATION INTEGRATION

CROSS-REFERENCE TO RELATED APPLICATION

This application claims priority to U.S. Provisional Patent Application No. 62/573,662, filed Oct. 17, 2017, the entire contents of which is incorporated herein by reference.

TECHNICAL FIELD

This disclosure relates generally to mobile application integration.

BACKGROUND

Mobile application ("app") developers, mobility professionals and end users desire apps with seamless integration into trusted services and solutions. There are significant challenges, however, to integrating mobile apps developed using multiple programming languages on multiple platforms with enterprise grade authentication, enterprise mobility management (EMM), Access (VPN), mobile app management (MAM), security and other capabilities. Integration is time consuming and resource intensive, and multiple quality assurance (QA) and release cycles create nightmare scenarios for the mobile developer that wants to serve an enterprise customer. A mobile developer or independent software vendor (ISV) typically has to choose from three flawed integration approaches: software development kits (SDKs), mobile operating systems with app programming interfaces (APIs) and wrappers.

Software development kits (SDKs) aid the development process and are offered by every major service vendor. But SDKs still require a heavy development effort to implement, manage and maintain. Because SDKs are vendor-specific, solution-specific, and platform-specific they typically solve a tiny fraction of the overall mobile integration challenge. SDKs may make a discrete integration project easier, but the overall integration effort across multiple projects, versions, platforms and use cases remains heavy. SDKs are not automatic. They replace direct source code integration but impose an additional step in the integration process. SDKs require new expertise, one tailored to the specific SDK and still requires platform-by-platform builds, releases and QA.

Mobile operating systems have started to incorporate mobile management app programming interfaces (APIs) into their platforms. This allows mobile developers and ISVs to use the management controls inside the mobile operating system (OS) to manage devices and apps. The biggest advantage of these built in features is that the mobile developer or ISV need not compile a version of the app with a specific SDK to allow users to manage the app. The biggest disadvantage is that the OS-based feature set is not universal across platforms. One OS might support one set of features while another OS supports a different or lesser set. This divergence leaves some users and some enterprises without access to critical features needed in their environment. In many cases, the missing features force the app to fail security requirements, which hinders deployment and adoption of the app. The mobile OS approach also forces the device to be enrolled in a single EMM system. In an increasingly mobile workplace, where contracting is commonplace, this is often impractical for large-scale deployments. Mobile OSs are gaining new app management capabilities but it is early days and often not suitable for large-scale deployments where consistency and security are important.

App wrapping promise more vendor-specific faster mobile app integration than SDKs. But like SDKs, app wrappers are platform-specific, solution-specific and lack standards. Wrappers also spawn new problems such as imposing functionality limitations, often resulting in unpredictable behavior. Wrappers rely on intercepting or modifying app layer APIs. Wrappers stand between the native app functions and the EMM or MAM and can actually collide with apps. For example, when a mobile app uses frameworks or is built using mobile app development platforms (MADPs), basic EMM functions such as creating container files are a challenge for wrappers. Because wrappers are sensitive to loading order, framework usage and app logic, wrappers often cause apps and frameworks to fail. Interacting with a huge and ever-growing number of possible APIs leaves room for error. It also leaves functionally walled off by the wrapper, making wrapping undesirable for many developers. Wrapping also creates problems for commercial apps. For example, ISVs typically don't support wrapping because it interferes with the native operations of the app.

SUMMARY

Systems, methods, devices and non-transitory, computer-readable storage mediums are disclosed for automated mobile app integration. In an embodiment, a network-based, automated app fusion platform (AFP) allows rapid integration of multiple third-party functions to mobile apps, shortening the deployment cycle and connecting mobile apps to other services on demand. The AFP provides codeless service that operates as a mobile integration workflow in the cloud and allows users to perform integration projects on the final app package. No source code is required by the platform and users of the platform require no development experience. Likewise, no modifications to an app or SDK are required to complete integration projects on the AFP.

In an embodiment, a method comprises: receiving, by a server computer from a development system, a first application binary executable for an application; receiving, by the server computer, a dataset specifying mobile services to be added to the application, the dataset selected by a user of the development system; dynamically and automatically generating a software adapter for adapting one or more plugin software components to the first app binary executable according to the dataset; generating, by the server computer and without access to source code for the first application binary executable, a second application binary executable for the application, the generating including merging the first application binary executable with binary code for the adaptor and the plugin software components; and transmitting, by the server computer to the development system, the second application binary executable.

Other embodiments are directed to methods, systems, apparatuses and non-transitory, computer-readable storage mediums.

Particular embodiments disclosed herein provide one or more of the following advantages. The AFP offers an intuitive, fast, network-based service with minimal steps required to achieve the fusion of commercial and custom applications with a wide variety of third party functionality ranging from management SDKs to security capabilities and the like. The AFP is a general purpose, open integration layer for mobile applications. With the AFP, multiple mobile services can be combined with a single app, quickly and painlessly. To use the AFP, a mobile developer needs zero access to source code. There are no additional agents loaded on the mobile device. All the capabilities are integrated directly into the native app binary without impacting application level APIs. Fused in services can co-exist inside the same application and provide a better feature set granularity and choice.

With the AFP, the user experience, performance and functionality of the app are maintained. Even run time decisions can be made, enabling or disabling certain capabilities based on organizational policy so that unneeded features are not running and thus are not consuming system resources. The AFP adds a runtime integration module that interacts, and connects, only with the function intended by the user. The AFP is not limited to a single service. Any service the user desires to connect with their app can be integrated simply and easily.

The AFP automates the integration effort and its implementation is simple and quick. The user simply brings the app binary onto the AFP and the entire process of fusing capabilities like an SDK or mobile security feature set is automated. The AFP leverages an intuitive network-based web interface that can render a fused app within just a few minutes. The AFP works as part of the user's app and remains intact and unaltered. The user's app calls the AFP code as the first element of the binary. OS interactions such as file I/O and networking get processed through the AFP code. The AFP code can be reconfigured and turned off to make debugging easier.

Unlike wrapping, the AFP does not require any additional frameworks or libraries. As such, there are no conflicts with other frameworks, manipulation of load ordering or complexities related to parallel loading using the same AppID as the underlying app. The AFP provides broad platform support across all mobile development platforms, frameworks and operating systems like Apple Inc.'s iOS® and Google's Android® with full enterprise store and consumer facing store support via Apple Inc.'s AppStore® and Google Play®. Target functionality can be fused in minutes without impacting or interfering with thousands of application level APIs or impacting the user app's native functionality.

The AFP is extensible and allows multiple SDKs or portions of SDKs (or implementations of SDKs or portions of SDKs), even from different vendors, to be fused to a single user app. The AFP works seamlessly with Internet of Things (IoT) solutions found in retail, financial services, healthcare and critical infrastructure. This type of extensibility can only be achieved with the AFP as conventional approaches simply cannot apply broadly to the varied number of IoT device types. Since the AFP does not require access to source code and works directly with binaries, the difficult process of trying to obtain app source code is eliminated. The user does not need to limit integration based on source code availability. Internally developed applications and commercial applications can be fused with management, security and other functionality within minutes instead of months. Application developers are frequently held to time-to-market metrics. With the AFP, third party integration time is virtually eliminated.

The AFP is designed to be intuitive and usable for anyone building, managing or deploying mobile apps. This also means that the AFP allows ISVs to reach more users and use cases with their apps, without depending on internal engineering resources to develop one-off solutions to integrate their mobile apps.

The details of the disclosed implementations are set forth in the accompanying drawings and the description below.

Other features, objects and advantages are apparent from the description, drawings and claims.

DESCRIPTION OF DRAWINGS

FIG. 8 is mobile device architecture, according to an embodiment.

The same reference symbol used in various drawings indicates like elements.

DETAILED DESCRIPTION

Overview of App Fusion Platform (AFP)

Figure 1:
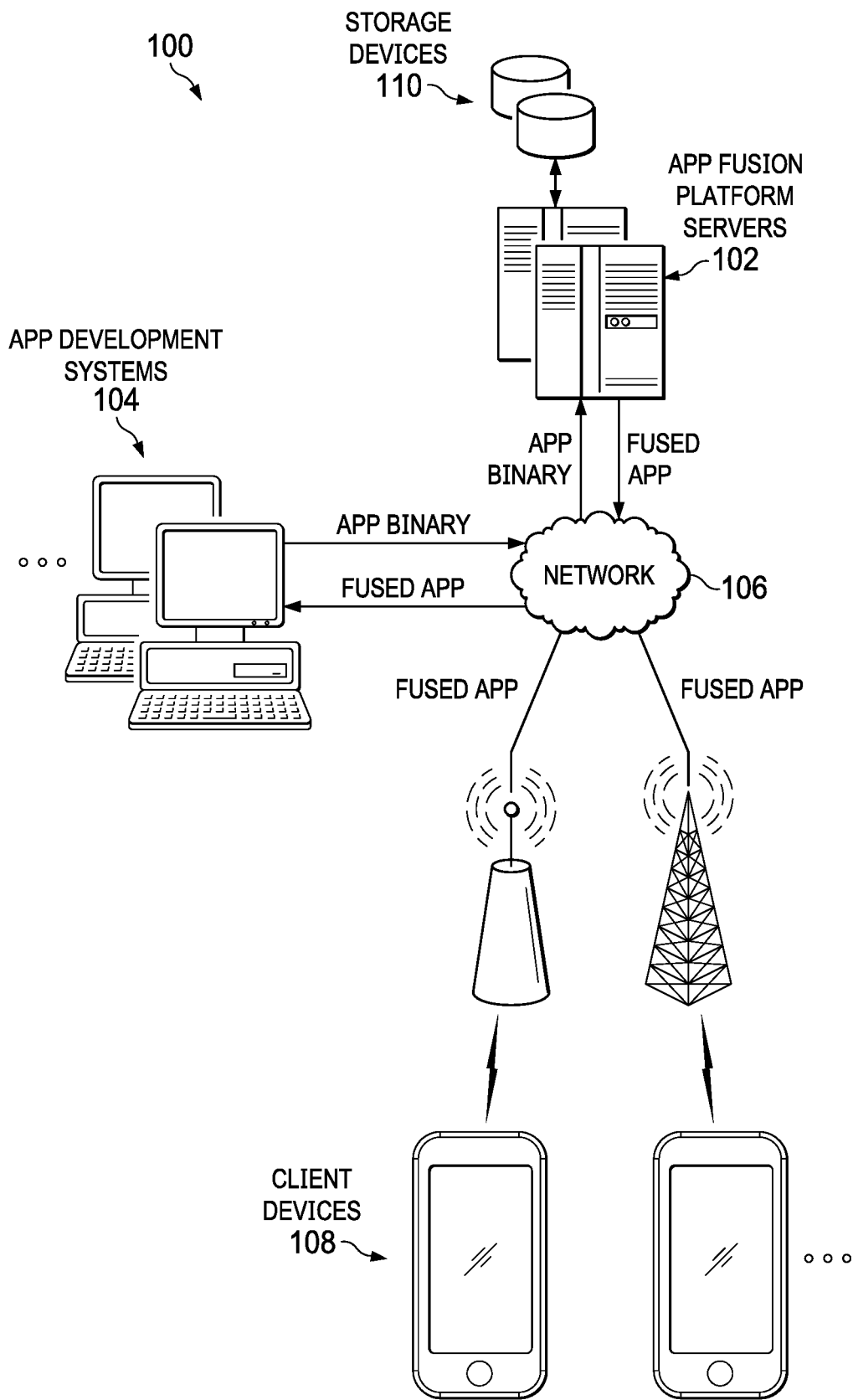
FIG. 1 is a block diagram of a computing environment that includes the AFP, according to an embodiment.

FIG. 1 is a block diagram of a computing environment 100 that includes the AFP, according to an embodiment. Computing environment 100 includes AFP servers 102, app development systems 104, network 106 (e.g., the Internet) and client devices 108. AFP servers 102 are coupled to storage devices 110. Client devices 108 include any mobile device that can run a software app, including but not limited to: smartphones, tablet computers, wearable devices and IoT devices. App development systems 104 include any computers or devices that are capable of uploading and downloading binary files from AFP servers 102 through network 106, and that include input/output devices that allow the user to interact with the AFP.

AFP servers 102 implement the AFP in "the cloud" as a system as a service (SaaS). The SaaS automates the mobile app integration process by enabling mobile developers and mobility professionals to integrate services such as mobile security or implement full SDKs (or portions of SDKs) with new or existing mobile apps using only the app binary. The process is fast and simple and does not require source code access, and eliminates the need for development cycles and ongoing software maintenance.

AFP servers 102 include a web server that provides web pages with GUIs that allow users to interact with the AFP by providing an intuitive workflow for uploading, fusing, signing, deploying and analyzing fused apps. After the user selects the mobile apps/services/SDKs (hereinafter also referred to collectively as "services") that the user would like to integrate ("fuse") with their app binary, the services are fused with the app binary, producing a new app binary, hereinafter also referred to as a "fused app." The fused-in services co-exist inside the same app and provide better feature set granularity and choice. In an embodiment, run time decisions can be made by the user to enable or disable certain capabilities based on organizational policy so that unneeded features are not running and thus are not consuming system resources.

In an embodiment, the AFP includes an app library that enables users to upload and store an unlimited number of mobile apps in a stateful repository (e.g., storage devices 110) and make them available for integration to any number of services, as described in further detail below. In an embodiment, the AFP includes a fusion workbench that allows users to select the preferred mobile services to fuse to a particular app and creates datasets referred to as "fusion sets" (saved combinations of fusion settings unique to each user) to apply to apps. In an embodiment, the AFP includes an app publishers service that allows users to access commercial app binaries (e.g., ISV apps) and commercial SDKs (e.g., EMM SDKs, authentication SDKs). The AFP also allows users access to enterprise authentication and access services. The AFP also has mobile security features that can be selected and fused with any app.

Example AFP GUIs

Figure 2A:
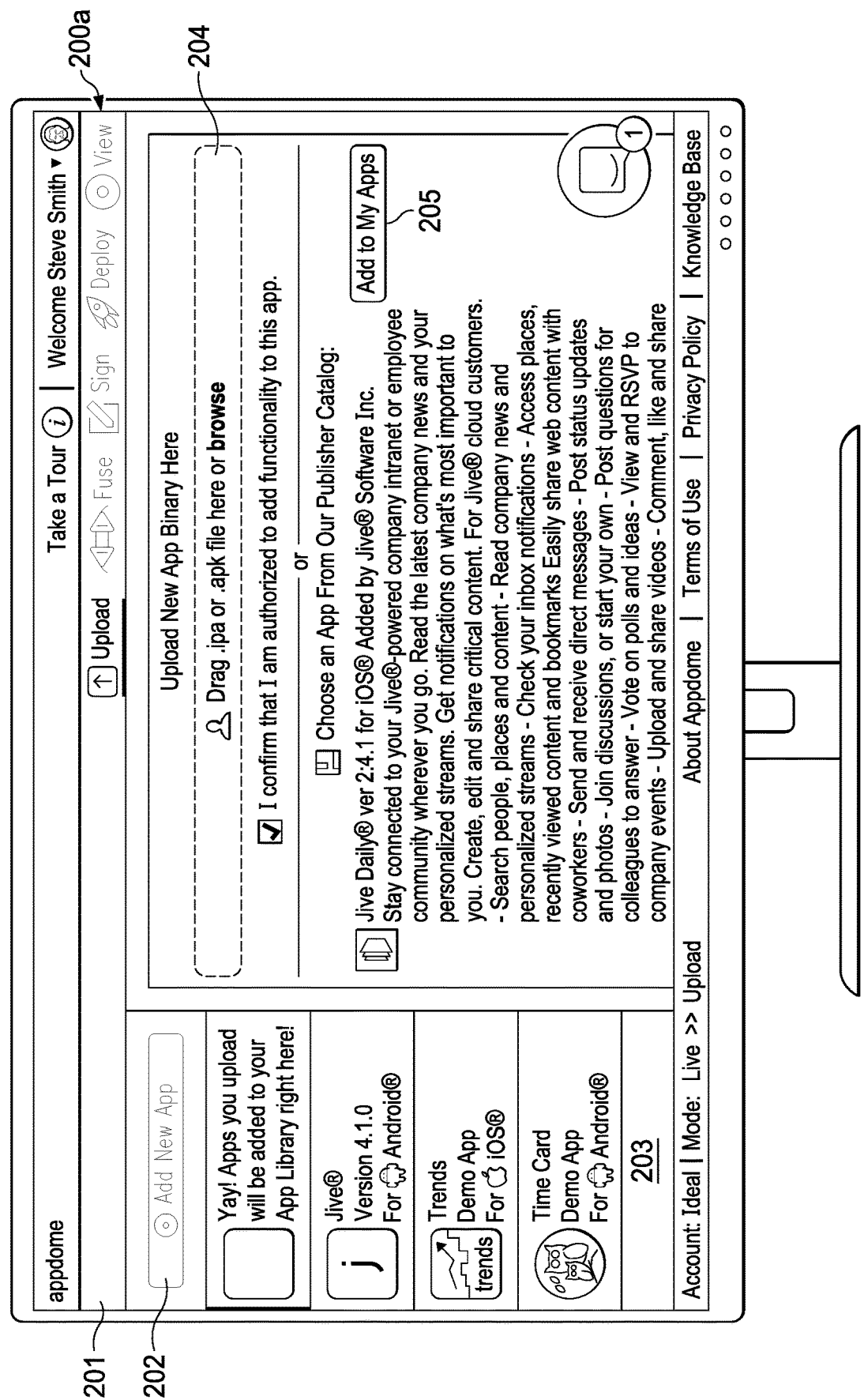
FIG. 2A illustrates a graphical user interface (GUI) presented by the AFP for uploading binary code for a user app, according to an embodiment.

FIG. 2A illustrates a GUI 200*a* for uploading binary code for a user app, according to an embodiment. The fusion process begins when the user (e.g., a mobile app developer or IT professional) logs into the AFP servers 102 from their development system 104 as is presented with GUI 200*a*. GUI 200*a* includes navigation bar 201, affordance 202, user app library 203, binary drop zone 204 and affordance 205. GUI 200*a* is displayed when "Upload" is selected in navigation bar 201. A user can add new app binaries by clicking/touching affordance 202, which invokes a browser on their computer to find and select app binaries to add to user app library 203. When an app is added its icon is displayed in user app library 203. When the user is ready to fuse their app, they can drag the icon for the app from user app library 203 into binary drop zone 204. When the user releases the icon in binary drop zone 204, the app binary is uploaded from the development system 104 to AFP servers 102. The user can choose an app from a publisher catalog to fuse with their app binary by clicking/touching affordance 205.

Figure 2B:
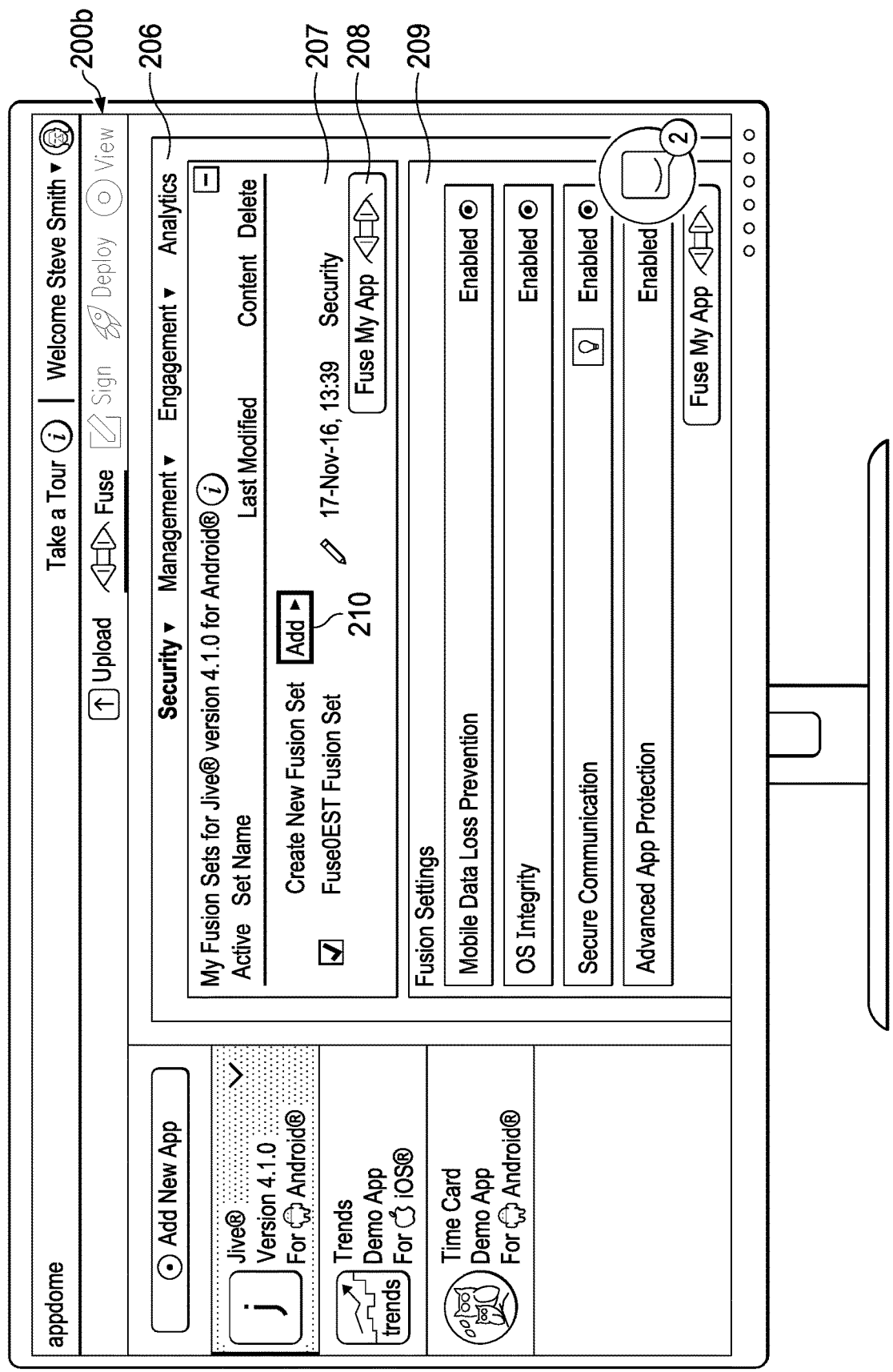
FIG. 2B illustrates a GUI presented by the AFP for selecting fusion sets, according to an embodiment.

FIG. 2B illustrates a GUI 200*b* for selecting fusion sets, according to an embodiment. GUI 200*b* is shown when the "Fuse" option is selected in navigation bar 201. When the "Fuse" option is selected, secondary navigation bar 206 is displayed that allows the user to select among the following service types: Security, Management, Engagement and Analytics. Window 207 displays information about the fusion sets for the app and allows the user to add new fusion sets using affordance 210. The information can include an active/inactive indicator, set name, last modified data and a brief description of the content of the fusion set (e.g., security). Below window 207 is window 209 for displaying fusion settings for the fusion set. In the example shown, a fusion set for security services is shown which includes the following example fusion settings: mobile data loss protection, OS integrity, secure communication and advanced app protection. Affordance 208 can be clicked/touched by the user to start the app fusion process on AFP servers 102.

Figure 2C:
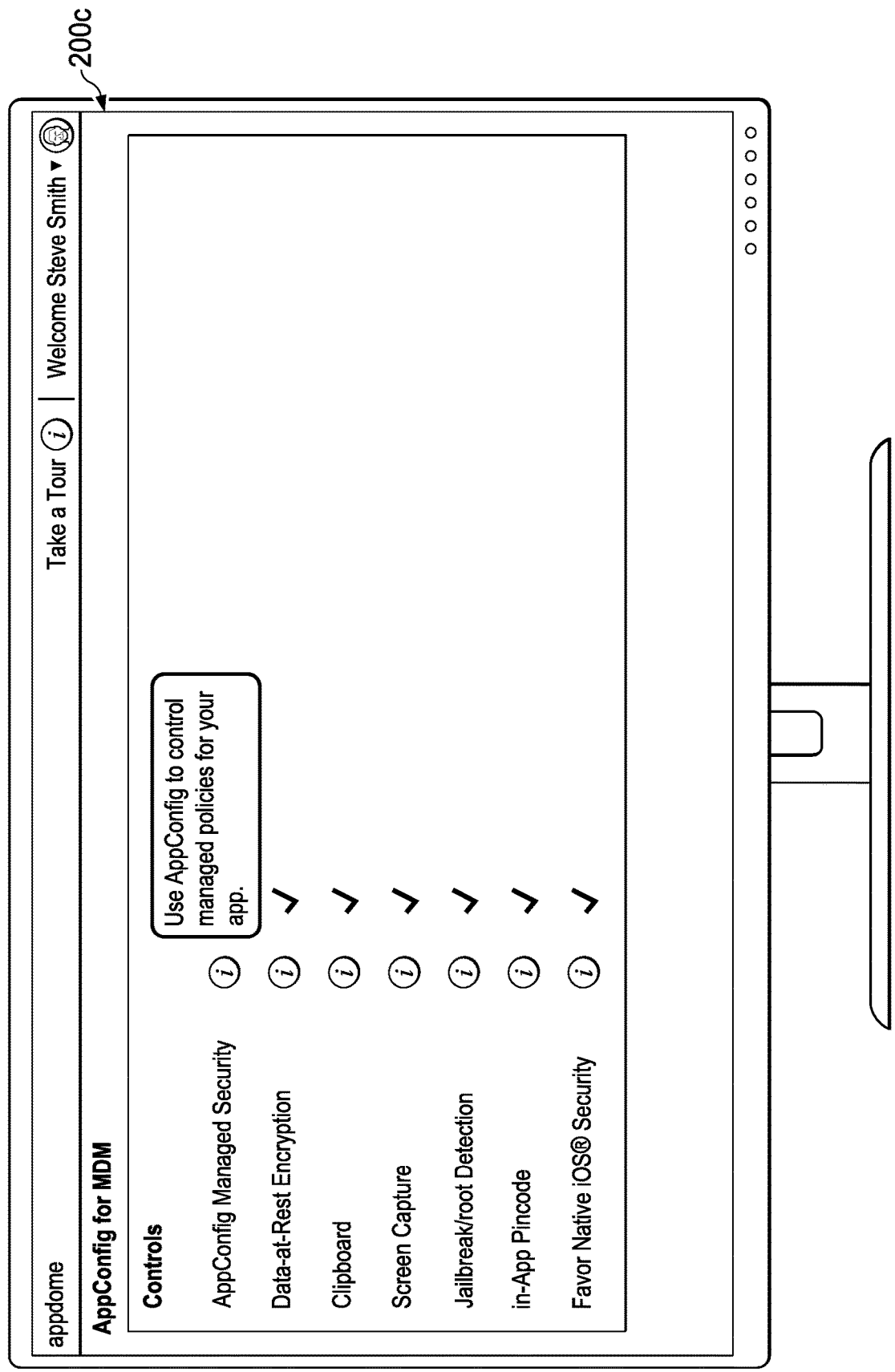
FIG. 2C illustrates a GUI presented by the AFP for AppConfig for MDM, according to an embodiment.

FIG. 2C illustrates a GUI 200*c* for AppConfig for MDM, according to an embodiment. The AppConfig Community is a collection of industry leading EMM solution providers and app developers that have adopted a standard approach to app configuration and management that builds upon app security and configuration frameworks available in the OS. Members of the AppConfig Community are making it simpler for developers to implement a consistent set of controls so that enterprise IT administrators can easily configure and manage apps according to their business policies and requirements. End users benefit from automated features that give the end users instant app access without requiring cumbersome setup flows or user credentials. GUI 200*c* allows the user to specify AppConfig controls for MDM, which in this example includes: AppConfig managed security, data-at-rest encryption, clipboard, screen capture, jailbreak/root detection, in-app pincode and favor native iOS security.

Figure 2D:
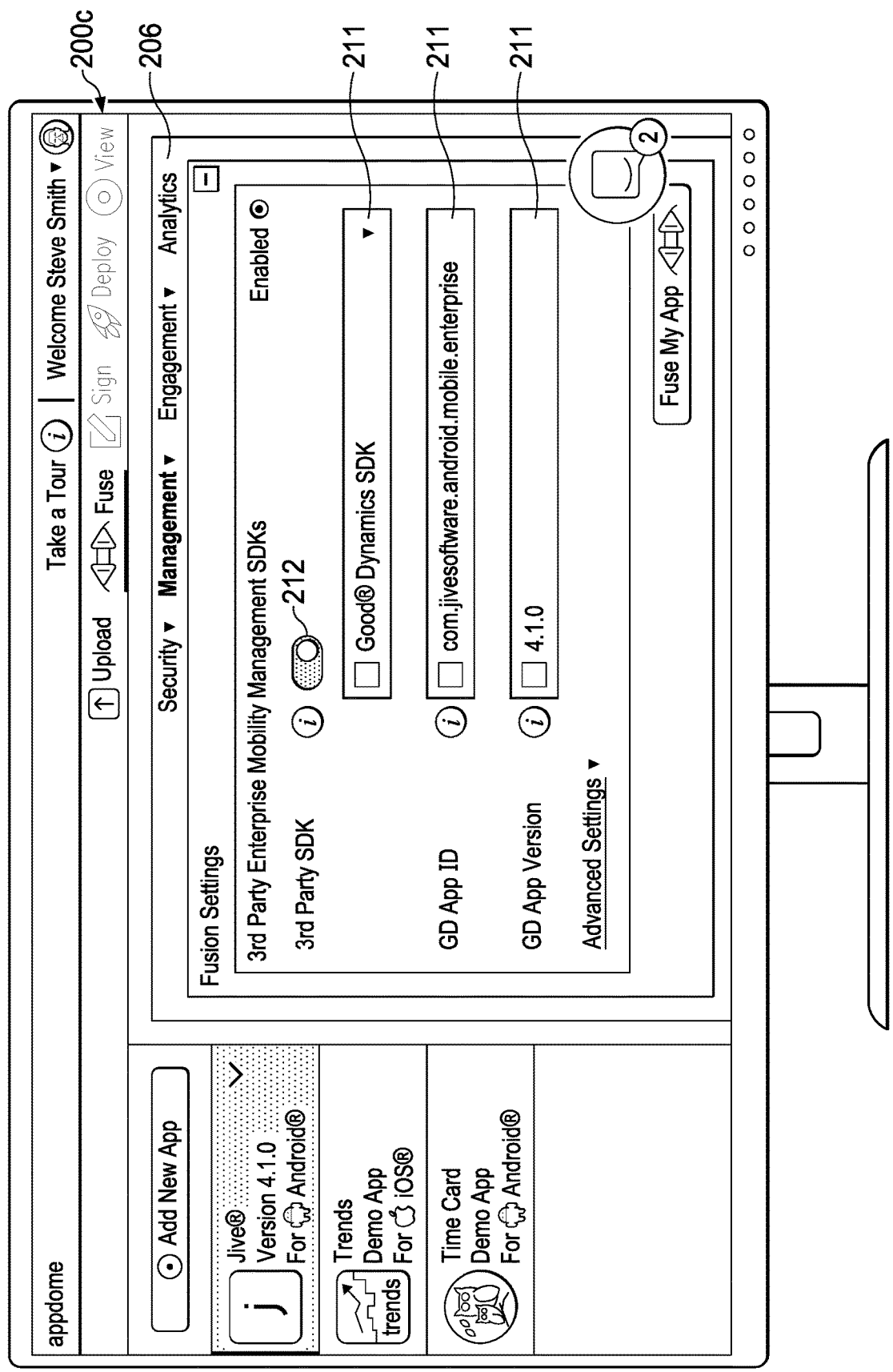
FIG. 2D illustrates a GUI presented by the AFP for selecting fusing settings, according to an embodiment.

FIG. 2D illustrates a GUI 200*d* for selecting fusing settings, according to an embodiment. GUI 200*d* is displayed when Engagement and Analytics options are selected in secondary navigation bar 206. In the example shown, text fields 211 allow the user to enter the name, AppID and version of any number of third party Enterprise Mobility Management SDKs to add to the fusion process. In the example shown, the user is adding an implementation of Blackberry® (formerly Good) Dynamics SDK, version 218.1.

Figure 2E:
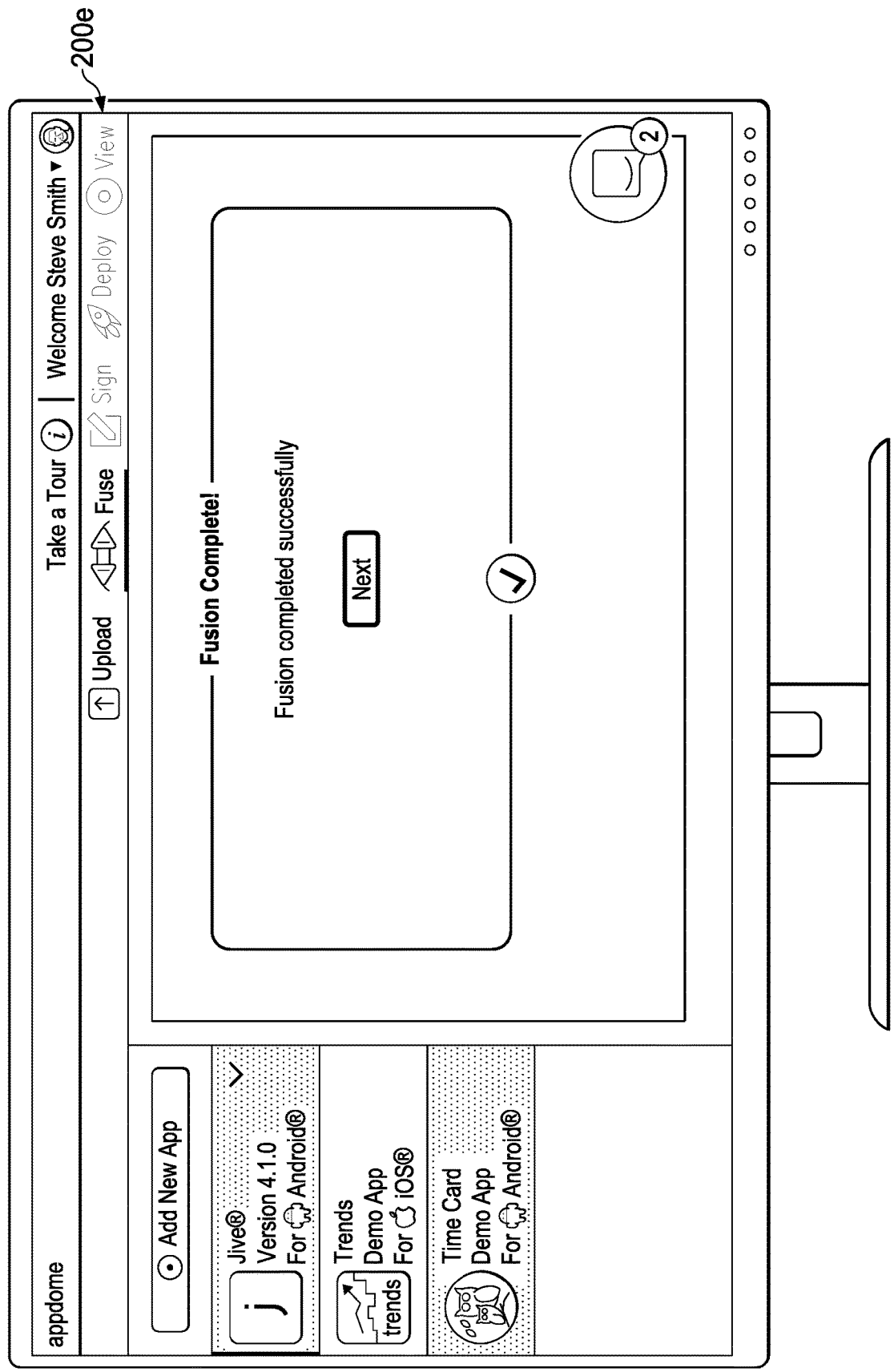
FIG. 2E illustrates a GUI presented by the AFP for indicating fusion completion, according to an embodiment.

FIG. 2E illustrates a GUI 200*e* for indicating fusion completion, according to an embodiment. When fusion completes, the fused app is placed in the user library 203 and the user is prompted for another upload.

Figure 2F:
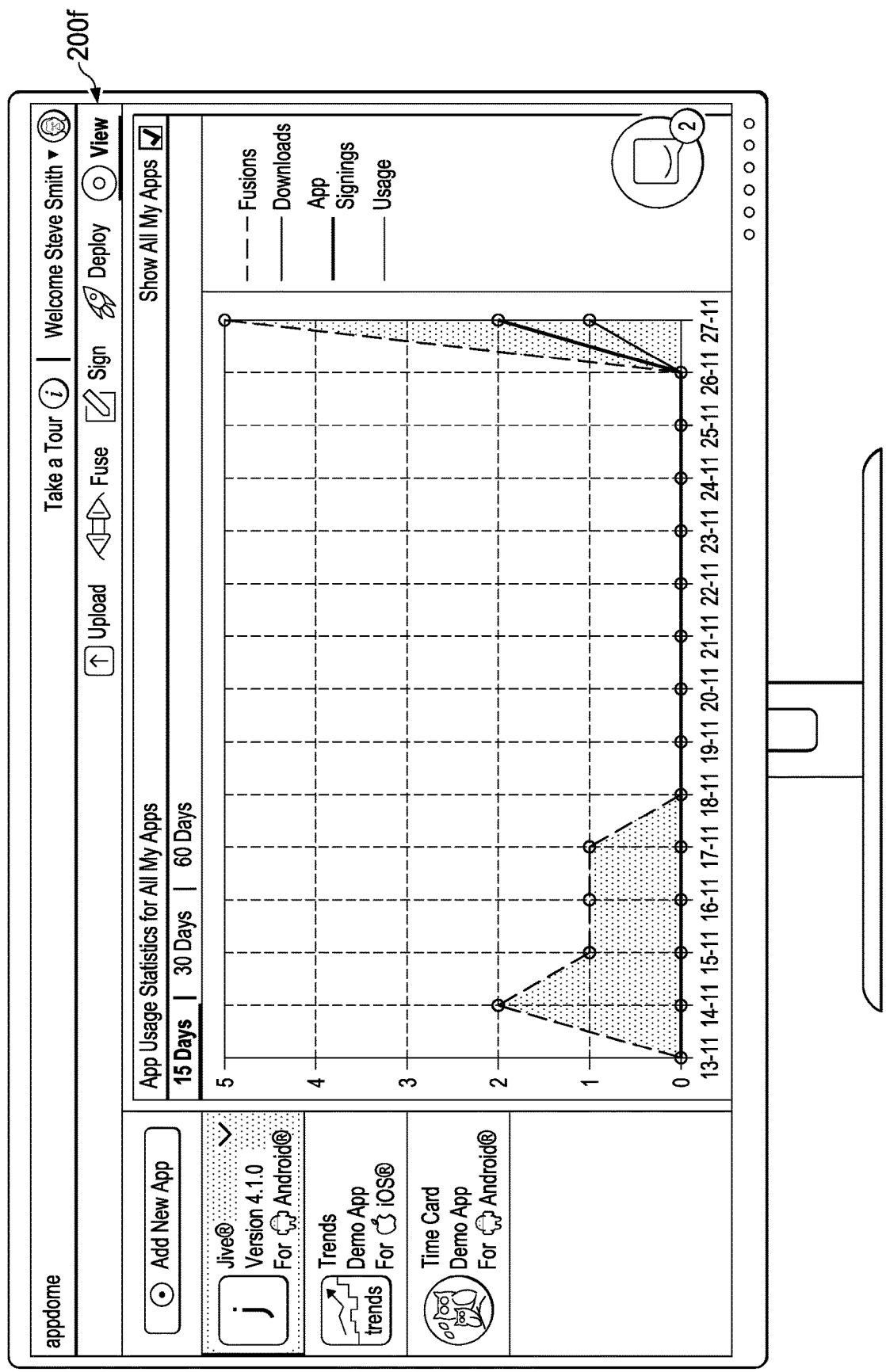
FIG. 2F illustrates a GUI presented by the AFP for displaying user app usage statistics, according to an embodiment.

FIG. 2F illustrates a GUI for displaying user app usage statistics, according to an embodiment. GUI 200*f* displays charts of app usage statistics, including fusions, downloads, app signings and usage. The charts can be displayed for various time windows, such as 15, days, 30 days, etc.

Figure 3:
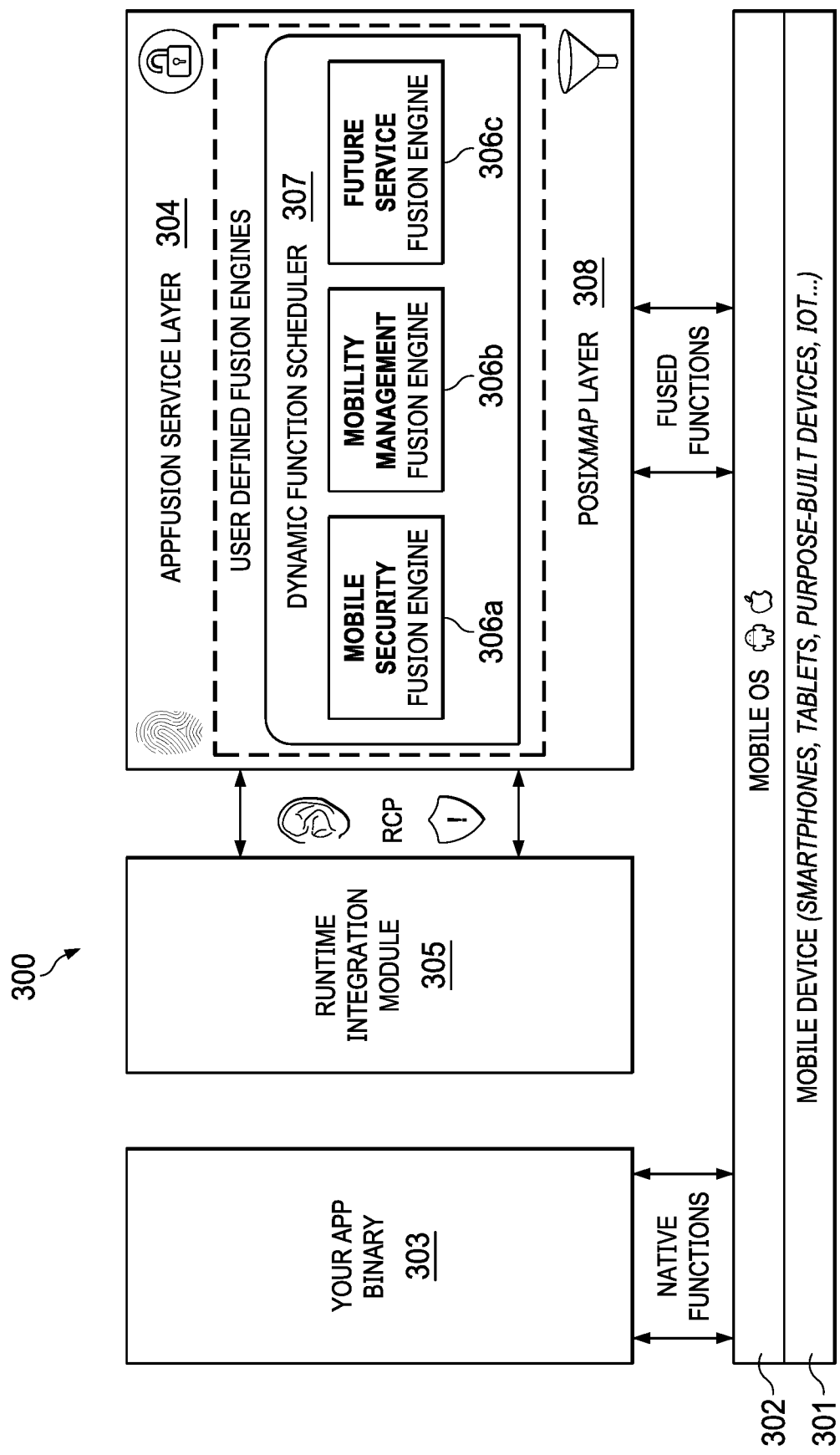
FIG. 3 illustrates a fusion adaptor architecture, according to an embodiment.

FIG. 3 illustrates an app fusion architecture, according to an embodiment. App fusion architecture 300 includes mobile device hardware 301 (e.g., smartphone, tablet computer, wearable device, IoT device), mobile OS 302 (e.g., Android® OS, iOS®), app binary 303, app fusion service layer 304, runtime integration module 305, user-defined service engines 306*a*-306*c*, dynamic function scheduler (DFS) 307 and posixmap layer 308.

Figure 4:
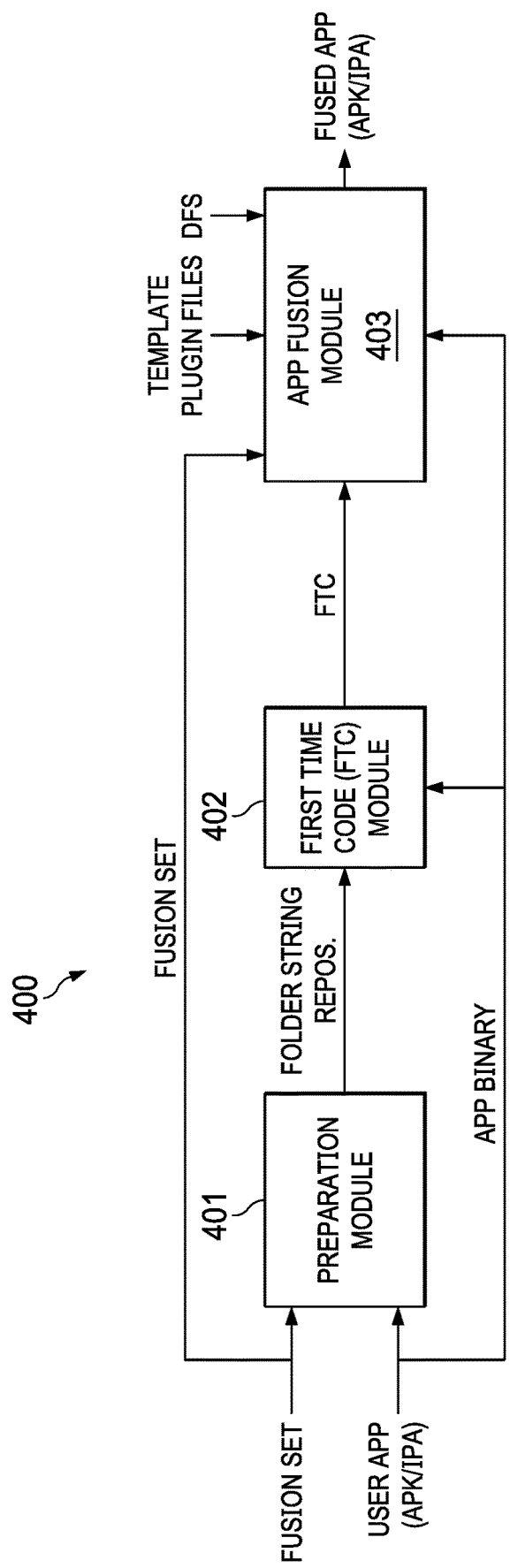
FIG. 4 is a block diagram illustrating a Java® app fusion system, according to an embodiment.

Each mobile application included in the user-selected fuse set will have a corresponding app fusion adaptor, which is dynamically and automatically generated as described in reference to FIGS. 4-5. Each app fusion adaptor has static and dynamically generated parts. In this example, service engine 306*a* is a mobile security service engine, service engine 306*b* is a mobility management service engine and service engine 306*c* is any other service engine. There can be any number and type of service engines for type of mobile service, application or SDK. A service engine is added to the binary only if a user selects a service to be fused with app binary 303. For example, only if a user selects mobile security features will mobile security engine 306*a* be added to app binary 303. If the user selects an EMM SDK then mobility management service engine 306*b* will be added to app binary 303 and so forth. Therefore, and advantage over conventional mobile application integration solutions is that the user controls what services are added or "fused" with their app binary 303.

When more than one service engine is included in architecture 300, DFS 307 is added, which is a codebase that manages conflicts, interactions and priorities between each service engine 306a-306c, as described more fully in reference to FIGS. 4-5. For example, DFS 307 evaluates the features a user selects and compares the features to native OS functions that perform the same functions to determine and resolve conflicts. Conflicts can also be exposed to allow users to set priorities during the fusion process.

To communicate with app binary 303, runtime integration module 305 interacts with app binary 303 on a runtime basis, substituting intermittent commands based on the native logic of app binary 303. Architecture 300 does not change app binary 303 or inject code into app binary 303. The native functions of app binary 303 are preserved, conforming the SDK to the way app binary 303 works instead of forcing app binary 303 to conform to the SDK. The commands are semi-permanent, meaning they exist only as long as necessary to perform the function requested by app binary 303.

Above and below service engines 306a-306c, respectively, there is app fusion service layer 304 and posixmap layer 308. App fusion service layer 304 encrypts and protects the fused app. It also has basic account identifiers, fingerprints and other features that communicate with AFP servers 102. Posixmap layer 308 allows the app fusion adapter to communicate with mobile OS 302 independent of app binary 303, to ensure app binary 303 behaves and performs as expected. The portable operating system interface (POSIX) is a family of standards specified by the IEEE Computer Society for maintaining compatibility between operating systems. POSIX defines the application programming interface (API), along with command line shells and utility interfaces, for software compatibility with variants of Unix and other operating systems.

Example MMAP

Memory mapped files are a kernel mechanism that synchronizes memory to a file on disk. This means that if M(n) is the memory content and F(n) is the file contents, then the relation is generally M(n)=F(n+offset). There are however situations where there's a requirement for the memory (M) and file data (F) to be correlated with a non-trivial relation: M(n)=G(F(n+offset)). These types of memory-maps are not natively supported on most operating systems because the relation depends on G and its implementation. In an embodiment, non-trivial M-to-F correlations are emulated completely in user mode. The method relies on the kernel providing an interface to catch page-faults, together with user-mode managed memory maps to keep track of memory and file access and keep them in sync while maintaining the G correlation (and its inverse correlation G−1). In addition, the method makes sure that different maps to the same file are also kept in sync despite occupying different areas of physical memory.

FIG. 4 is a block diagram illustrating a Java® app fusion system, according to an embodiment. System 400 includes preparation module 401, first time code (FTC) module 402 and fusion module 403. In the description that follows, the app fusion process for Android® OS is described. It is noted, however, that the disclosed AFP can automatically fuse mobile applications and services for any desired mobile operating system, including iOS®, Windows® 10 Mobile, Blackberry® Secure and any mobile operating system that is based on Android Open Source Project (AOSP).

In an embodiment, preparation module 401 receives as input an app binary (APK) file and a fusion set. A fusion set is the summation of all user selections made on the AFP and the settings per selection, as described in reference to FIGS. 2B, 2D and 3A. APK files are compressed files (e.g., .zip files) containing resources and assembled Java code. Preparation module 401 extracts the APK file into a folder. In an embodiment, a tool like the publicly available Apktool (https://ibotpeaches.github.io/Apktool/documentation/) is used to extract the APK into a folder structure. For example, the "apktool d (decode)" command can be used to extract the AKP file. An example folder structure output by apktool is shown below.

Manifest (editable file that contains information about the files packaged in the JAR file)
YAML (human-readable metadata) - app version etc.
Resources (XMLs) - user interface (UI), strings etc.
Smali (code) - byte code
Assets - App specific resources (e.g., files, configuration etc.)
Extra (other, orig)
.so(s) (Java native shared object (dynamic) library)

Tools like Apktool operate on binary resources and manifest files. Because apktool only converts APK files into text files, preparation module 401 performs an in-binary file modification process on the APK files in cases where textual conversion or resources extraction do not work well (e.g., large apps, obfuscated files, etc.). The output of preparation module 401 is an extracted folder described above and a string repository. The string repository includes all strings used in the APK file. The string repository is used later in the fusion process for string encryption (e.g., to support tampering detection) and app analysis.

FTC module 402 generates code that will be executed first whenever the user app is launched. On Android® OS, an app is not a monolithic entity and includes multiple entry points. This means that the app can be "launched" based on different user scenarios (also known as "intents"). For example, a user can launch an app by tapping on its icon from the home screen. The same app can also be launched when the user opens a file or starts a call. These user scenarios depend on the "intents" the app supports. There is no single point in the app in which to place code to start the app for the first time, since there is no real FTC that runs on Android® OS. FTC module 402 creates the necessary unique FTC that is run as the first step of an app, regardless of the "intent" that caused the app to launch and start.

In an embodiment, FTC module 402 may receive as input smali code and the manifest file (e.g., an AndroidManifest.xml file) included in the folder structure output by preparation module 401. Smali/Baksmali is an assembler/disassembler for the dex file format used by Dalvik, Android's Java virtual machine (VM) implementation. Programs for Android are commonly written in Java and compiled to bytecode for the Java VM, which is then translated to Dalvik bytecode and stored in dex (Dalvik Executable file) and odex (Optimized Dalvik Executable) files.

FTC module 402 analyzes the manifest file and handles structuring all the "activities." The "activities" serve as the entry point for a user's interaction with an app, and are also central to how a user navigates within an app or between apps (e.g., using "Back" and "Recents" buttons).

FTC module 402 dynamically generates activities supportive code and adds it to the code of the app, so that all activities will invoke the corresponding fused code as the code executed by the activity.

Fusion module 403 receives as inputs template plugin files (e.g., object code or "O" files), a fusion set (FS) and the DFS. When files are compiled and linked, a typical compiler and linker supports only one scheme of ordering (creating a priority order) between compiled and linked files. This scheme is typically a position dependent scheme. Meaning when compiling or linking two object files (e.g., O files), the compilation or linkage order is determined by the position of the file in the stream, left to right, first to last. This conventional scheme does not allow a position independent scheme, and thus limits the way prioritization can be done.

For example, if two files (file1, file2) include code and a developer wants to ensure that file1 will be loaded before file2, a conventional linker can be used. If, however, file1 includes function1 and functionA, and file2 also includes function1 and functionA, and the developer wants function1 from file1 to be loaded first, but functionA from file2 to also to be loaded first (meaning before functionA in file1), conventional linkers cannot provide this position independent priority. Since the AFP fuses different components from different vendors, each component is fully compiled and linked in-house by the vendor. Often, different components include identical functions such as main ( ), init ( ), load ( ), etc.

The AFP uses the DFS to establish a priority between different fully compiled and linked components from different vendors. DFS is a position independent priority scheme that can be used with a standard compiler and linker. DFS allows not only linked files to be dependent on one another but also linked functions. Furthermore, linked functions in different files can adhere to a priority scheme that includes standard order elements such as "order_before," "include_any" and "include_all." DFS is used by the AFP to create an ordered list of template plugin software components (hereinafter also referred to as "plugin(s)"), an ordered list of functions and priority scheme based linkage and code initialization, which is not dependent on position in the code or in the linkage process.

After the template plugins are ordered and prioritized by DFS, fusion module 403 ensures that that data "travels" from plugin to plugin in an orderly fashion in accordance with the DFS. Furthermore, adaptor 403 ensures that a function call also travels from one plugin to another in the same way. For example, if Plugin1 wants to handle an "open" system call and Plugin3 wants to handle an "open" system call as well, but Plugin2 does not, fusion module 403 ensures the following is true, whenever the "open" system call is invoked. Plugin1 is the first Plugin to process the system call and can return directly to the app if the logic requires a return (e.g., if Plugin1 decides that "open" is not allowed). If Plugin1 calls the "open" system call, the next plugin to process the call is Plugin3 (not Plugin2), so in fact, the call should travel to Plugin3. If Plugin2 invokes the "open" call, the call should actually travel to Plugin1 since Plugin1 is registered to handle the call. In an embodiment, import markers and call depths are used with hook code to ensure that data travels from plugin to plugin in an orderly fashion as described above.

Hooking to Control Execution Flow

Figure 5A:
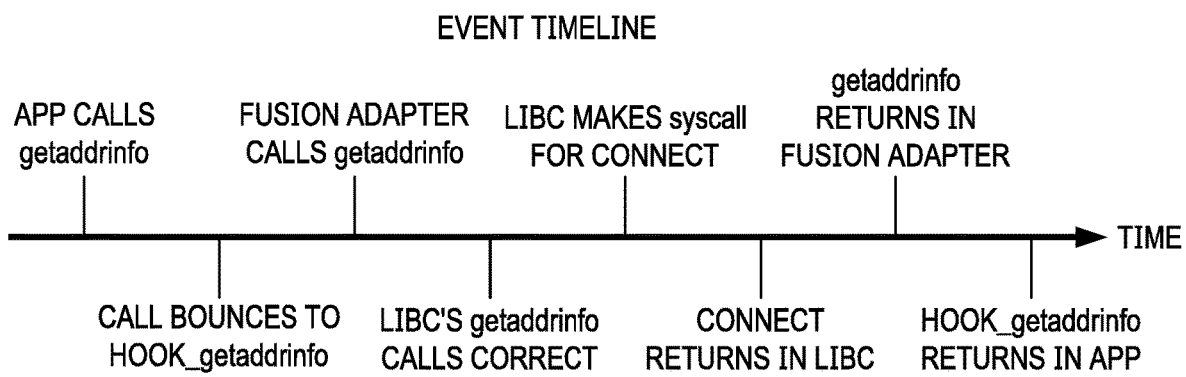
FIG. 5A is an example event timeline of a desired execution flow using hooking, according to an embodiment.

FIG. 5A is an event timeline of an example desired execution flow using hooking, according to an embodiment. As described above, the AFP adds code (hereinafter "AFP code") to the fused binary app that modifies the behavior of certain aspects of user apps by re-implementing groups of library functions and system calls, and then replacing the functions with new implementations, referred to herein as hooking. A hook on a function (e.g., an open function) behaves is as if there is a "shield" around that function. Any code that attempts to call the hooked function, gets "deflected" to the hook's implementation. When system libraries are used to perform the function, a short-circuit style loop can result. To circumvent the loop, calls that originate from AFP code penetrate the hook "shield" such that the AFP code does not trigger hook handlers.

Referring to the event timeline in FIG. 5A, the app calls a method (getaddressinfo). The call bounces to a hook handler which makes the call instead of the app. The hook handler makes the call to the operating system kernel using a system call. A system call (or kernel call) is a request for service that a program makes of the kernel. In an embodiment, the GNU C Library (libc) provides the "syscall" function for making the system call. The connect is returned to the syscall and the getaddressinfo is returned to the hook, which then returns getaddressinfo to the app.

To implement the desired execution flow shown in FIG. 5A, the hooks should be disabled as long as execution flow is inside the bounds/context of a hook handler. This requirement can be implemented by two software mechanisms. A first mechanism marks and unmarks points in the execution flow that indicate that execution flow is within a hook handler. A second mechanism selectively responds to a triggered hook, e.g., call the hook handler or ignore the trigger.

To implement the first mechanism, before calling a hook handler a flag is turned on that indicates the hook handler is currently running. Upon returning from the hook handler, the flag is turned off. Instead of the hook trigger invoking the hook handler, the hook trigger invokes MARKED_HOOK_connect ( ):

```
MARKED_HOOK_connect (socket, address, addrlen):
    SET_MARKER ( )
    retval = HOOK_connect (socket, address, addrlen)
    CLEAR_MARKER ( )
    return retval
```

When a hook is triggered, the hook handler (MARKED_HOOK_connect) is called only if the flag (MARKER_IS_SET) is off. If the flag is on, the original function (connect) is called:

```
SWITCH_HOOK_connect (socket, address, addrlen):
    if MARKER_IS_SET ( ):
        return MARKED_HOOK_connect (socket, address, addrlen)
    else:
        return connect (socket, address, addrlen)
```

Figure 5B:
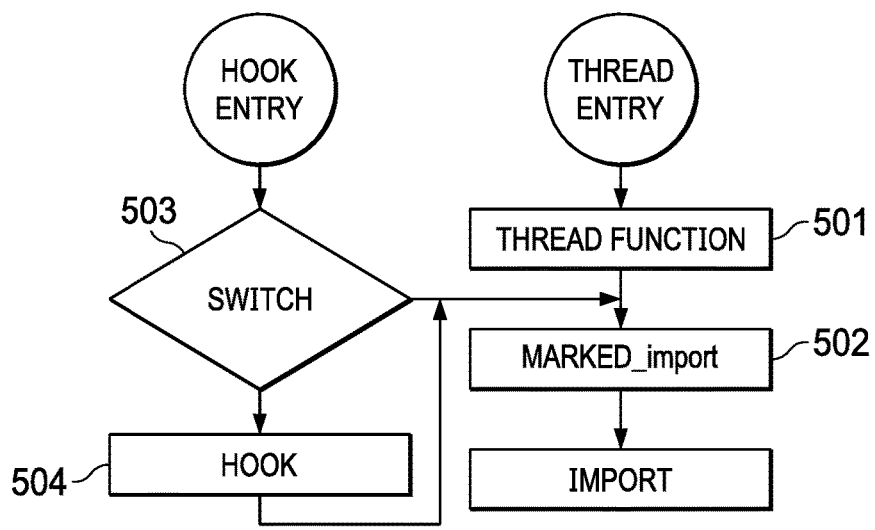
FIG. 5B is a flow diagram of an execution flow where the marker set and clear functions are moved to the import, according to an embodiment.

FIG. 5B is a flow diagram of an execution flow where the marker set and clear functions are moved to the import, according to an embodiment. If there is a thread in the AFP code that periodically calls getaddrinfo the hook on connect may be triggered. This happens because at the point of the hook trigger on connect, the mark flag was off because nothing turned it on. This means the mechanism should recognize a segment of execution that came from AFP code. If SET_MARKER_( ) and CLEAR_MARKER_( ) from the hook handler MARKED_HOOK_connect ( ) are moved to the imports of the AFP code, the execution flow shown in FIG. 5B results.

For a hooked function func, the hook-switch decides whether to call the hook implementation HOOK_func 504 or the function func 501 itself. The hook-switch function 503 can be implemented as shown below.

```
HOOK_SWITCH_func (arg1, arg2, ...):
    if tls_marker_is_set ( ):
        return func (arg1, arg2, ...)
    else:
        return HOOK_func (art1, arg2, ...)
```

The HOOK_SWITCH function above passes all its arguments verbatim. This means not modifying the registers or the stack. Achieving stack neutrality is platform specific. An example, HOOK_SWITCH function 503 for an ARM32 platform is shown below:

```
HOOK_SWITCH_func:
    push            {r0-r12, lr}
    bl              tls_is_marker_set
    cmp             r0, #0
    beq             CallHookHandler
    pop             {r0-r12, lr}
    b               func
CallHookHandler:
    pop             {r0-r12, lr}
    b               HOOK_func
```

In an embodiment, MARKED_import function 502 can be implemented as follows:

```
MARKED_import (...):
    tls_set_marker ( )
    retval = import (...)
    tls_clear_marker ( )
    return retval
```

Adjustments for Plugins

Once plugins are introduced, there is no longer a single on/off flag that indicates being in the context of the AFP code. In this case, there is a need to know not only that the code is running in the AFP code context but from which plugin. A plugin can be indicated by its depth in a plugin stack. With a base plugin being depth 0, the one above it 1 and so on. Each plugin can access its own depth via the global variable plugin_depth.

Switching can be based on the depth of the plugin and the thread. Using a utility function to determine the direction of the switch (the function is static because a unique copy is needed for each plugin):

```
static int should_call_hook (void)
{
    return tls_get_depth ( ) > plugin_depth;
}
```

An example of hook-switch code is shown below.

```
HOOK_SWITCH_func (arg1, arg2, ...):
    if should_call_hook ( ):
        return HOOK_func (arg1, arg2, ...)
    else:
        return func (arg1, arg2, ...)
```

An example, HOOK_SWITCH function for an ARM32 platform is shown below:

```
HOOK_SWITCH_func:
    push            {r0-r12, lr}
    bl              should_call_hook
    cmp             r0, #0
    beq             CallOrig
    pop             {r0-r12, lr}
    b               HOOK_func
CallOrig:
    POP_ALL
    b               func
```

Instead of set_marker and clear_marker, the depth is saved by setting it to the plugin's depth and then restore the original depth as follows:

```
MARKED_import (...):
    save_depth = tls_get_depth ( )
    tls_set_depth (plugin_depth)
    retval = import (...)
    tls_set_depth (saved_depth)
    return retval
```

Since saved_depth must be stored somewhere, and since the stack is not an option, saved_depth can be stored in an auxiliary stack like lr:

```
void pre_import (uintptr_t lr)
{
    tls_push (lr);
    tls_push (tls_get_depth ( ));
    tls_set_depth (plugin_depth);
}
uintptr_t post_import (void)
{
    tls_set_depth (tls_pop ( ));
    return tls_pop ( );
}
```

Plugin Intercommunication

In an embodiment, plug-in intercommunication is implemented using an event driven design, where each plugin registers a handler for every event, every plugin can send any event, and when an event is sent, all of the event handlers are called. Every event handler receives one parameter of type const void*. Event registration can be done at compile time and cannot be changed during runtime. An example function call and handler for events is shown below. Conversely, each thread is assigned the depth of the plugin in whose context it runs. If the code runs in the context of no plugin (e.g., the app's code), then the depth is some MAX_DEPTH, which can be MAX_UINT.

```
//sending an event
    send_event ("event_name", data)
//defining an event handler
    EVENT_HANDLER (handler_name, "event_name",
    parameter_name)
    {handler body}
```

To prevent typos and incorrect use of events, a file can contain a list of available events so they can be verified during compile time. The structure ("struct") defining each event can be in the file containing the list of events.

The EVENT_HANDLER defined above can be implemented using the following pseudo code:

```
event_handler_s<handler_name>_handler = {"event_name",
  handler_name};
    void handler_name (const void *parameter_name)
    {
        handler_body
    }
```

All of the instances of event_handler_s structures can be in a section of a library loading "libloader" file. The send_event method can iterate over this section, find all of the event handlers for a given event and call all of the handlers. The plugin name in each handler can be kept in the section for debug purposes. In an embodiment, instead of working with strings, the strings can be placed in a dedicated section of the libloader file where two strings with the same content in the same section are merged. Instead of comparing strings, pointers to the strings are compared. In release versions of the app, the string section can be zeroed out.

A challenge that arises when joining different components together is duplicate symbols. In an embodiment, fusion module 403 adds a prefix to imports and exports to ensure they are connected to one another ("chained") with no duplicate symbols, and that renames are applied to both the plugin invocation and the import table that is attached to each plugin.

In an embodiment, fusion module 403 adjusts the binary code to be compliant with the federal information-processing standard (FIPS), if requested so by the user. In an embodiment, in-line encryption and decryption is performed on strings located in the app code.

In an embodiment, the AFP has the ability to remove certain elements from an app binary and move them into another area using a zero-out data technique. For example, data used in key management or important business logic can become inaccessible to static analysis efforts. This technique converts data to pointers to hide or obfuscate the data. Standard stripping tools do not provide the same level of security because stripping tools only strip away symbols and function names but not code or data. In an embodiment, the AFP extends standard stripping tools to be strip away not just symbols, but also metadata referring to symbols such as load commands, debug lines, decorations, etc.

For iOS® apps, and in an embodiment, the AFP binds binaries together so they are loaded together by encrypting the Objective-C selectors (SELREFs). The encryption ensures that a binary being loaded cannot load without having its SELREFs decrypted. Since the decryption code and key requires all binaries to be present in the patched executable, SELFREFs can only be unlocked when all the binaries are available.

The end result of the processes described above is a shared object library (.so file). In an embodiment, architecture leveling is performed on the .so file to adjust the code to run on a variety of hardware architectures using a variety of different binary formats (e.g., ARMv7A, ARMv7 suitable binaries and ELF/ELF64 object file format).

In a next step, fusion module 403 merges into a single binary file the .so file created as described above, the smali code extracted from the original AKP file and the bundled SDKs and services specified by the user-selected fusion set. Fusion module 403 compiles Java m4 files into conditional Java based on the user-selected fusion set, which means that only user-selected code is included in the final APK file.

During the code merge logs and debug data are removed from the binary code so that it is not available in the resulting fused APK file. Code merging can be performed using the techniques described in U.S. Pat. No. 9,934,017 for "A Method and System for Merging Several Binary Executables," issued Apr. 3, 2018, which patent is incorporated by reference herein in its entirety.

Fusion module 403 compiles only relevant Java files based on the plugin selection. When merging binary (smali) code into a single app, one cannot simply copy and paste all of the code together. Rather, fusion module 403 creates a new working folder for the smali code and populates it with the fused smali code. Since smali is limited to 64 k methods per dex file, adaptor 403 automatically determines which code should be available in the first dex file (e.g., app launch) and which code can be deferred to a later dex file.

In an embodiment, "multidex" file support is created. Some code is inserted into the first dex file and the rest into the last dex file to make code available to the app on startup (e.g., before the multidex initializes). The dependencies and code that should be accessible in the first dex file and the last dex file is determined. In an embodiment, there are 64 k methods per dex file.

During the smali merge, fusion module 403 overloads classes and code that need to be overloaded. For example, BlackBerry® Dynamics SDK and BehavioSec® SDK require access to every button and text box in the app. During the smali merge, fusion adaptor 403 overloads the relevant classes in the smali code. In an embodiment, fusion module 403 also merges "hooks" to track, intercept and handle app life cycle events (e.g., sleep, resume etc.). At this stage, the FTC generated by FTC module 402 is merged into the final fused APK file.

In an embodiment, fusion module 403 includes a capability to "burn" an organizational policy in a secured manner into the fused app binary. Such a policy can be composed of binary (true/false) values, strings and data. This policy is part of the binary and therefore cannot be tampered with, unlike policies that reside in external files located in the app package. The app bundle identifier used to check for tampering is burned into the binary and the security string sections (e.g., SECSTR sections) are encrypted. All changes to the manifest are applied, such as "debug," "backup," and "version." Permission settings between SDKs and apps are "leveled" by merging all required permissions into a single permission file. For every SDK that needs FTC façade(s), launcher activities are adjusted as façade(s) and SDKs are merged using an SDK "template" folder that includes just the SDK code (based on an empty app mechanism). To include just the SDKs specified by the user-selected fusion set into the fused app, fusion module 403 creates a fused app that includes the SDKs and extracts just the SDKs from the fused app by comparing the binary of the empty app with the binary of the fused app.

Next, all SDK classes and resources are automatically renamed to avoid conflicts with the fused app. If a fused app includes an SDK (original app) such as Mixpanel® mobile web analytics, and the fused-in SDK also uses the same code (also uses Mixpanel® for analytics), fusion module 403 merges the two SDKs together so the fused app will use its own Mixpanel® and the SDK will use its own Mixpanel®, while working together. Resources in Android® (e.g., UI elements such as buttons, text boxes, and strings) are numbered IDs.

When fusing resources together, ID numbering can conflict because ID numbers are not unique. In an embodiment, fusion module 403 reorders all IDs in such a way that the resulting app has all IDs (e.g., app, SDKs and fusion adaptor IDs) available.

Next, the merged folder is used to rebuild an APK. During this step, the app may reach a limit of 64 k methods (app plus SDKs combined). Fusion module 403 automatically splits the app into several DEX files as needed to accommodate the entire code.

iOS® Fusion Process

In an embodiment, an iOS® fusion process performs a similar process as the Java® fusion process but with several differences noted below.

Similar to the Java® fusion process, the user uploads an app binary file and selects a fusion set as described in reference to FIGS. 2A-2D. For example, the user uploads an IPA file. An IPA file is an iOS application archive file which stores an iOS app binary for an ARM® architecture that can only be installed on an iOS® device. Files with the IPA extension can be uncompressed by changing the extension to .zip and unzipping. The IPA is unzipped into an extracted folder.

An iOS® app is composed of the app code itself, and any additional extensions, dynamic libraries and frameworks. A software framework provides generic functionality that can be selectively changed by user-written code to create application-specific software. Software frameworks may include libraries and APIs that bring together different components to enable development of an app. Also, an iOS® app can contain global variables and sections that are initialized on a first load, such as "load/init" functions of Objective-C/SWIFT programming languages. Like in the Java® fusion process, first time code or FTC is merged with the fused app such that the FTC is initialized first after the fused app is executed. Unlike Java® FTC, the iOS® FTC is suitable on a per extension type basis. This means that the AFP has the ability to fuse and launch the FTC for all extension types, including but not limited to WatchKit® and AppleTV®.

The generation of fusion adapters for iOS® and code merging using template plugin files, fusion set and DFS is the same as described for the Java® fusion process in reference to FIGS. 4 and 5.

In an embodiment, after the final fused and merged APK or IPA is generated, it can be sealed for delivery to the development system or client devices. For Java®/Android® apps, the APK file is unzipped to retain the SHA1 of classes.dex file, and a checksum is calculated for all binary elements for tamper proofing. For iOS® apps, entitlements for binaries are rebuilt and extracted.

In an embodiment, the user can sign the fused app using the AFP. For Java®/Android® apps, the file is re-zipped in a manner to maintain the exact location and offset within the new zip file as in the original zip file to prevent parsing errors on different versions of Android®. For iOS® apps, an integrity check is performed on all types of provisioning profiles, including support for multiple profiles for multiple binaries. The AFP creates a loadable binary by combining and leveling entitlements so that the resulting fused app is loaded and run even if there are entitlement conflicts that otherwise would cause the app to exit.

Example Processes

Figure 6:
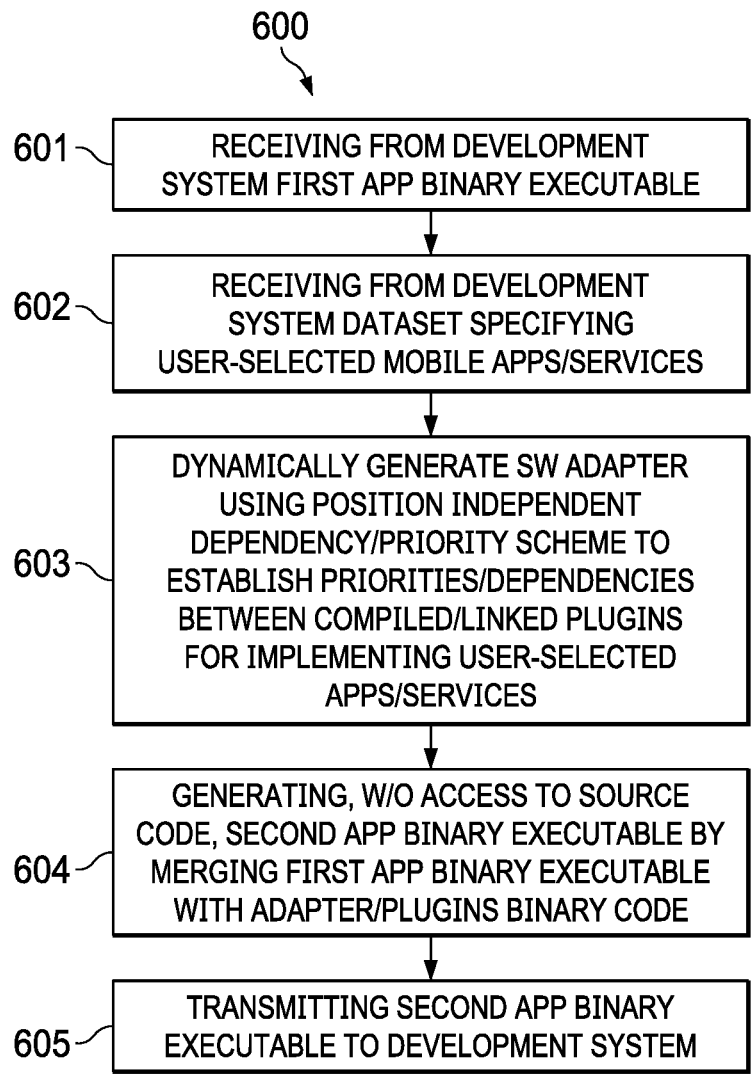
FIG. 6 is a flow diagram for an app fusion process, according to an application.

FIG. 6 is a flow diagram for an app fusion process, according to an application. Process 600 can be implemented using the server computer architecture 700 described in reference to FIG. 7.

In an embodiment, process 600 can begin by receiving, by a server computer from a development system, a first app binary executable (601). For example, a user working the development system can utilize the GUI described in reference to FIG. 2A to upload the first app binary executable (e.g., APK or IPA binary) to the server computer.

Process 600 can continue by receiving, from the development system, a dataset specifying user-selected mobile apps and services to be added to the first app binary executable (602). For example, the user can utilize the GUIs described in reference to FIGS. 2B-2E to select one or more mobile apps or services (e.g., SDKs) and other services to be added or "fused" to the first app binary executable.

Process 600 can continue by dynamically and automatically generating a software adaptor using a position independent dependency and priority scheme to establish priorities and dependencies between compiled and linked plugin software components for implementing the user-selected mobile apps and services. (603). For example, DFS is used by process 600 to create an ordered list of template plugin software components, an ordered list of functions included in the plugins and priority scheme based linkage and code initialization, which is not dependent on position in the code or in the linkage process.

Process 600 can continue by generating, without access to the source code of the first app binary executable, a second app binary executable by merging the first app binary executable with binary code for the adaptor and the plugin software components. (604), as described in reference to FIGS. 4-5.

Process 600 can continue by transmitting, by the server computer, the second app binary executable to the development system (605). The user can then use a GUI provide by the AFP to sign and deploy the second app binary executable to client devices.

Example Server Architecture

Figure 7:
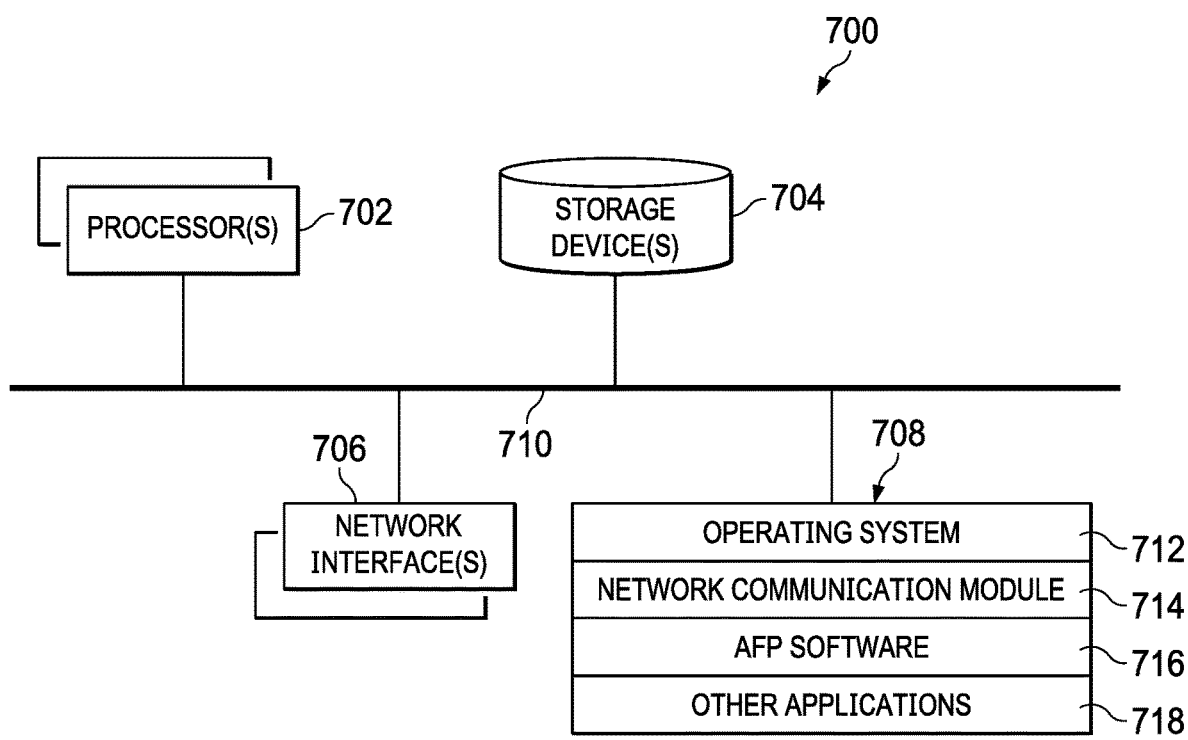
FIG. 7 is a server computer architecture for automated mobile app integration, according to an embodiment.

FIG. 7 is a block diagram of example server architecture for implementing the features and processes described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 810 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server), network communication module 714, remote location-tracking service 716 and other services 718.

Operating system 712 can be multi-user, multiprocessing, multitasking, multithreading, real time, etc. Operating system 712 performs basic tasks, including but not limited to:

recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.).

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Mobile Device Architecture

FIG. 8 is a block diagram of example mobile device architecture 800 for implementing the features and processes described in reference to FIGS. 1-6. Architecture 800 may be implemented in any electronic device for generating the features and processes described in reference to FIGS. 1-6, including but not limited to smart phones, tablet computers, wearable computers and IoT devices (e.g., smart watches, fitness bands). Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functionalities. For example, motion sensor(s) 810, light sensor 812, and proximity sensor 814 may be coupled to peripherals interface 806 to facilitate orientation, lighting, and proximity functions of the mobile device. For example, in some implementations, light sensor 812 may be utilized to facilitate adjusting the brightness of touch surface 846. In some implementations, motion sensor(s) 810 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 806, such as a temperature sensor, a barometer, a biometric sensor or other sensing device, to facilitate related functionalities. For example, a biometric sensor can detect fingerprints and monitor heart rate and other fitness parameters. In an embodiment, a haptic motor (not shown) can be coupled to the peripheral interface, which can provide vibration patterns as haptic feedback.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used as an electronic compass.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and for receiving sound signals from an accessory device, as described in reference to FIGS. 1-6.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons and a virtual keyboard, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

In some implementations, device 800 may present recorded audio and/or video files, such as MP3, AAC, and MPEG video files. In some implementations, device 800 may include the functionality of an MP3 player and may include a pin connector for tethering to other devices. Other input/output and control devices may be used. In an embodiment, device 800 may include an audio processing unit for streaming audio to an accessory device over a direct or indirect communication link, as described in reference to FIGS. 1-6.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location (obtained by the GPS/Navigation instructions 868) of the device.

Memory 850 may include graphical user interface instructions 856 to facilitate graphic user interface processing, including a touch model for interpreting touch inputs and gestures; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes; camera instructions 870 to facilitate camera-related processes and functions; and fused app instructions 872, as described in reference to FIGS. 1-6. The GPS/Navigation instructions 868 include instructions for estimating location, including but not limited to an extended Kalman filter and other processes for estimating location.

Each of the above identified instructions and apps may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or app specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (app-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an App Programming Interface (API). An API may define on or more parameters that are passed between a calling app and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an app the capabilities of a device running the app, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by a server computer from a development system, a first application binary executable for an application;
receiving, by the server computer from the development system, a dataset specifying user-selected mobile services to be added to the application, wherein the dataset is selected by a user of the development system;
dynamically and automatically generating a software adapter for adapting one or more plugin software components to the first application binary executable for the application, wherein dynamically and automatically generating the software adapter further comprises using a position independent dependency and priority scheme to establish priorities and dependencies between different, fully compiled, and linked plugin software components for implementing the user-selected mobile services;
generating, by the server computer and without access to source code for the first application binary executable for the application, a second application binary executable for the application, wherein generating the second application binary executable for the application includes merging the first application binary executable for the application with binary code for the software adapter and the one or more plugin software components; and
transmitting, by the server computer to the development system, the second application binary executable for the application.

2. The method of claim 1, wherein dynamically and automatically generating the software adapter further comprises:
generating a first time binary code that is executed first whenever the application is launched; and
merging the first time binary code with the binary code for the software adapter and the one or more plugin software components.

3. The method of claim 2, wherein generating the first time binary code comprises:
extracting activities from a manifest file;
dynamically generating façade supportive code based on the activities; and
generating the first time binary code using the façade supportive code.

4. The method of claim 3, wherein dynamically generating the façade supportive code based on the activities further comprises:
automatically generating façade static constructors and dynamic façade runtime code; and
adding the façade static constructors and the dynamic façade runtime code to the first time binary code.

5. The method of claim 2, further comprising:
automatically determining how to split the second application binary executable into multiple files based on dependencies so that the first time binary code is available to the application on startup.

6. The method of claim 1, wherein using the position independent dependency and priority scheme to establish priorities and dependencies further comprises:
establishing an ordered list of the one or more plugin software components, an ordered list of functions within the one or more plugin software components, and a priority for linking and initializing the one or more plugin software components.

7. The method of claim 6, wherein establishing the ordered list of the one or more plugin software components further comprises:
establishing an order in which a function call is handled by the one or more plugin software components.

8. The method of claim 7, wherein establishing the order in which the function call is handled by the one or more plugin software components further comprises:
using a hook with import marking and a call depth parameter to establish the order in which the function call is handled by the one or more plugin software components.

9. The method of claim 7, wherein intercommunication between the one or more plugin software components is event driven where each plugin software component registers a handler for every event, every plugin can send any event, and when an event is sent, all of the event handlers are called.

10. The method of claim 1, wherein dynamically and automatically generating the software adapter further comprises:
determining that duplicate symbols are used by two or more plugin software components;
adding prefixes to all imports and exports of the two or more plugin software components to remove the duplicate symbols; and
renaming invocations of the two or more plugin software components and import tables that are associated with the two or more plugin software components.

11. The method of claim 1, wherein generating the second application binary executable for the application further comprises:
adjusting the second application binary executable to be compliant with one or more information-processing standards.

12. The method of claim 1, wherein generating the second application binary executable for the application further comprises:
adjusting the second application binary executable so that the second application binary executable can run on a particular hardware architecture with a particular binary format.

13. The method of claim 1, further comprising:
automatically renaming classes and reordering resource identifiers used by the one or more plugin software components to resolve conflicts between the one or more plugin software components and the second application binary executable.

14. The method of claim 1, wherein generating the second application binary executable for the application further comprises:
including a user-selected policy into the second application binary executable.

15. The method of claim 1, wherein one or more hooks are included in the second application binary executable for at least one of tracking, intercepting, or handling life cycle events for the application.

16. The method of claim 1, further comprising:
automatically overloading classes and methods used by the one or more plugin software components.

17. The method of claim 1, wherein the one or more plugin software components are software development kits (SDKs).

18. The method of claim 1, further comprising:
performing in-line encryption and decryption of strings in the first application binary executable.

19. The method of claim 1, further comprising:
removing logs and debug data from the first application binary executable.

20. The method of claim 1, further comprising:
adding a bundle identifier for the application into the second application binary executable for use in tamper detection.

21. The method of claim 1, further comprising:
merging required permissions for the one or more plugin software components and the first application binary executable into a single permission file.

22. A system comprising:
one or more processors; and
a memory configured to store instructions that when executed by the one or more processors, cause the one or more processors to perform operations comprising:
receiving, by a server computer from a development system, a first application binary executable for an application;
receiving, by the server computer from the development system, a dataset specifying user-selected mobile services to be added to the application, wherein the dataset is selected by a user of the development system;
dynamically and automatically generating a software adapter for adapting one or more plugin software components to the first application binary executable for the application, wherein dynamically and automatically generating the software adapter further comprises using a position independent dependency and priority scheme to establish priorities and dependencies between different, fully compiled, and linked plugin software components for implementing the user-selected mobile services;
generating, by the server computer and without access to source code for the first application binary executable for the application, a second application binary executable for the application, wherein generating the second application binary executable for the application includes merging the first application binary executable for the application with binary code for the software adapter and the one or more plugin software components; and
transmitting, by the server computer to the development system, the second application binary executable for the application.

23. A non-transitory computer readable storage medium configured to store instructions that when executed by one or more processors, cause the one or more processors to perform operations comprising:
receiving, by a server computer from a development system, a first application binary executable for an application;
receiving, by the server computer from the development system, a dataset specifying user-selected mobile services to be added to the application, wherein the dataset is selected by a user of the development system;
dynamically and automatically generating a software adapter for adapting one or more plugin software components to the first application binary executable for the application, wherein dynamically and automatically generating the software adapter further comprises using a position independent dependency and priority scheme to establish priorities and dependencies between different, fully compiled, and linked plugin software components for implementing the user-selected mobile services;
generating, by the server computer and without access to source code for the first application binary executable for the application, a second application binary executable for the application, wherein generating the second application binary executable for the application includes merging the first application binary executable for the application with binary code for the software adapter and the one or more plugin software components; and
transmitting, by the server computer to the development system, the second application binary executable for the application.

* * * * *